UNITED STATES PATENT OFFICE.

CHARLES E. MANBY, OF McKEESPORT, PENNSYLVANIA.

METHOD OF REDUCING AND SMELTING METALLIC ORES.

SPECIFICATION forming part of Letters Patent No. 388,891, dated September 4, 1888.

Application filed April 5, 1888. Serial No. 269,735. (No specimens.)

*To all whom it may concern:*

Be it known that I, CHARLES E. MANBY, of McKeesport, in the county of Allegheny and State of Pennsylvania, have invented a new and useful Improvement in Methods of Reducing and Smelting Metallic Oxides; and I do hereby declare the following to be a full, clear, and exact description thereof.

In the process of calamining metal a certain amount of dross forms on the surface of the bath, which dross from time to time is skimmed off, so as to preserve a clear and bright surface with which the iron is brought in contact. These skimmings of dross, however, cause a serious loss of the calamining alloy and iron, which becomes intermixed with the oxide of metals composing the dross.

Heretofore the calamine alloy, which is mixed with the dross and is lost by the skimming operation, has been but partially redeemed, which has been accomplished to a certain extent in a furnace, the purpose of which is to separate the dross from the pure metal. By this method, however, a residue of dry oxide is left in the shape of dust, which heretofore has had no market value, owing to the difficulty and expense of reducing it by the usual smelting process.

The purpose of my invention is to restore the oxide, as is hereinafter described.

The oxides are first placed in a suitable furnace, having previously been mixed with charcoal or other carbonaceous material, and the mass is brought to a red heat. This forms the first step of the process. After the oxides have been sufficiently reduced the heat is turned off and a current or atmosphere of natural gas is caused to pass over the reduced oxide, so as to prevent the oxidation of the metal during the cooling of the same. After the metal has been cooled I mix with the oxide a certain amount of common salt, (chloride of sodium,) about one measure of salt to three measures of the reduced oxide, which, by weight, is in the proportion of one part of salt to eight parts of oxide. After the salt and oxide have been thoroughly mixed they are placed or charged into a crucible or retort of large dimensions, which crucible is then placed in a hot furnace, which is raised to a temperature just sufficient to melt the salt, which temperature is maintained for about one hour, after which the temperature is suddenly raised until a perfectly fluid flux is formed, when, and after which, the metal is ready to be cast. The total time for this heating operation is from about two and a half to three hours or more, depending of course upon the instruments or means employed. The purpose of the salt is to form a semi flux during the continuance of the first dull red heat, which heat is insufficient to vaporize the metal, but is sufficient to brighten the surface of the reduced metallic globules, so as to enable the globules to unite with each other and run together, forming one molten mass, which mass finds its way to the bottom of the crucible or retort the moment the temperature is raised sufficiently to form the liquid flux.

Having thus described my invention, what I claim, and desire to secure by Letters Patent, is—

1. The hereinbefore-described method of reducing or restoring oxides of lead, tin, and other metals or alloys thereof, which consists in first reducing the oxides by heat in the presence of carbonaceous matter, then cooling the same in a non-oxidizing atmosphere, and finally melting the product when combined with salt or other suitable flux, substantially as and for the purposes described.

2. The hereinbefore-described method of reducing and restoring oxides of lead, tin, and other metals or alloys thereof, which consists in first reducing the oxides by heat in the presence of carbonaceous matter, then cooling the same in a non-oxidizing atmosphere, and finally subjecting the product mixed with salt to a red heat and then raising the temperature to a heat sufficient to fuse the fluxing material, substantially as and for the purposes described.

3. The hereinbefore-described process of melting reduced oxides of lead, tin, and other metals or alloys thereof, which consists in first subjecting the metal mingled with salt (chloride of sodium) to a dull red heat and then raising the temperature sufficiently to fuse the fluxing material, substantially as and for the purposes described.

In testimony whereof I have hereunto set my hand this 3d day of April, A. D. 1888.

CHARLES E. MANBY.

Witnesses:
JAMES K. BAKEWELL,
W. B. CORWIN.